United States Patent [19]

Roberts

[11] 4,284,029

[45] Aug. 18, 1981

[54] TAKE-OFF SAFETY INDICATOR FOR AIRCRAFT

[76] Inventor: Graham E. Roberts, 94 Park Ave. East, Ewell, Surrey, England

[21] Appl. No.: 81,258

[22] Filed: Oct. 2, 1979

Related U.S. Application Data

[63] Continuation of Ser. No. 850,487, Nov. 10, 1977, abandoned.

[30] Foreign Application Priority Data

Nov. 22, 1976 [GB] United Kingdom ............... 48672/76

[51] Int. Cl.³ .......................... G01C 23/00; G01D 7/04
[52] U.S. Cl. .................................. 116/300; 73/178 T; 116/334; 244/76 R
[58] Field of Search ....... 116/286, 334, 298, DIG. 48, 116/300; 73/178 T; 244/1 R; 340/27 R

[56] References Cited

U.S. PATENT DOCUMENTS

| 924,242 | 6/1909 | Kenerson | 73/137 |
|---|---|---|---|
| 2,424,570 | 7/1947 | Jenks | 116/129 L |
| 2,528,640 | 11/1950 | Coleman | 116/DIG. 37 |
| 2,946,053 | 7/1960 | Dayton | 73/178 T X |
| 3,174,710 | 3/1965 | Hoekstra | 244/76 |
| 3,241,362 | 3/1966 | Scott | 73/178 T |
| 3,368,065 | 2/1968 | Kendall | 73/178 T X |
| 3,465,512 | 9/1969 | Usui et al. | 58/53 |
| 3,557,748 | 1/1971 | Bowditch | 116/129 R |
| 3,863,204 | 1/1975 | Hoekstra | 340/365 R |

FOREIGN PATENT DOCUMENTS 2145926  4/1972  Fed. Rep. of Germany ... 116/DIG. 46

OTHER PUBLICATIONS

Publ. "Take-Off Aids to Pilots", by R. P. Snodgrass, pp. 24, 89, 90, 91, Skyways, Oct. 1957.

Primary Examiner—Daniel M. Yasich
Attorney, Agent, or Firm—Wenderoth, Lind & Ponack

[57] ABSTRACT

A take-off safety indicator for an aircraft has a double movement meter with a crossover pointer indication. The meter movements are driven respectively by inputs representative of speed and distance along the runway. The crossover point follows a locus and the optimum locus is shown on a background card selectable from a number of cards in dependence upon prevailing conditions.

5 Claims, 4 Drawing Figures

TAKE-OFF SAFETY INDICATOR FOR AIRCRAFT

This is a continuation of application Ser. No. 850,487, filed Nov. 10, 1977, now abandoned.

BACKGROUND OF THE INVENTION

The invention relates to an indicator for indicating safety conditions to a pilot during take-off of an aircraft.

During a take-off run, an aircraft accelerates until a critical air-speed is reached at which time the aircraft can become airborne. Clearly, the acceleration must be such that the critical speed is attained before the end of the runway. Acceleration depends upon a number of factors including loading of the aircraft, slope of the runway, and air pressure and temperature. Above all, however, the acceleration depends upon the engine power applied. It is customary for a pilot to apply maximum engine power during take-off although, except in the most critical conditions, maximum power is not necessary. It has been found that running aircraft engines at maximum power considerably shortens their useful life and it is desirable to be able to judge a take-off so that the aircraft becomes airborne before the end of the runway with adequate, but not excessive, power being applied. This demands considerable pilot skill 18 and an object of the invention is to provide an instrument which will assist the pilot in these judgements.

SUMMARY OF THE INVENTION

The present invention provides an indicator which corelates air-speed and distance covered along the runway and which gives an indication of these factors at all times during the take-off. The indication is dependent upon variable conditions such as aircraft loading, altitude of the runway, air temperature, etc. Instruments of this kind have been proposed and examples are shown in U.S. Pat. No. 2,922,982 and 3,174,710. However, such instruments are unduly complicated and expensive. The present invention seeks to provide an improved take-off safety indicator.

According to the present invention there is provided a take-off safety indicator including a meter with a double movement and a common face, each movement moving a respective pointer such that the two pointers form a cross-pointer indication. The meter further includes a removable indicator card disposed at the face, against which card the movement of the pointers can be observed. The card carries markings indicative of the desired locus for the cross-point of the pointers during take-off.

The meter movements are well known, as illustrated by U.S. Pat. No. 2,946,053, and may be such as to move the pointers in an arcuate manner from different centres or may be parallel pointer movements in which each pointer is moved across the face of the instrument rectilinearly in a direction perpendicular to its length. Although more expensive, this latter arrangement can make fuller use of the area of the meter face.

The indicator card can be transparent and placed in front of the pointers, but preferably it is placed behind the pointers for ease of reference. The markings on the indicator card will take into account, for example variables such as runway altitude, loading of the aircraft, ambient air pressure and temperature, slope of the airfield, and whether it is raining or not. Such factors, and others, have a bearing on the shape of the desired speed/distance curve which the aircraft should follow during acceleration to take-off. This shape is reflected in the markings on the card.

It is envisaged that in practice not more than a few different indicator cards will be required, perhaps the total number would be between six and ten cards, which would cover all combinations of conditions likely to be experienced in practice during take-off. Thus, it is envisaged that the pilot would have a set of standard cards appropriate to his aircraft, perhaps identified by number, and would insert the appropriate card on the indicator face before take-off. The appropriate card would be selected, taking into account the variable conditions mentioned above. Correlation of the large number of variables to determine the appropriate indicator card could be made in sequential steps by reference to a set of curves or tables which take the variables in pairs. In this way the variables can be eliminated in turn in arriving at the number of the card to be used.

BRIEF DESCRIPTION OF THE DRAWINGS

The invention will further be described with reference to the accompanying drawings, of which.

DETAILED DESCRIPTION OF THE INVENTION

Figure 1:
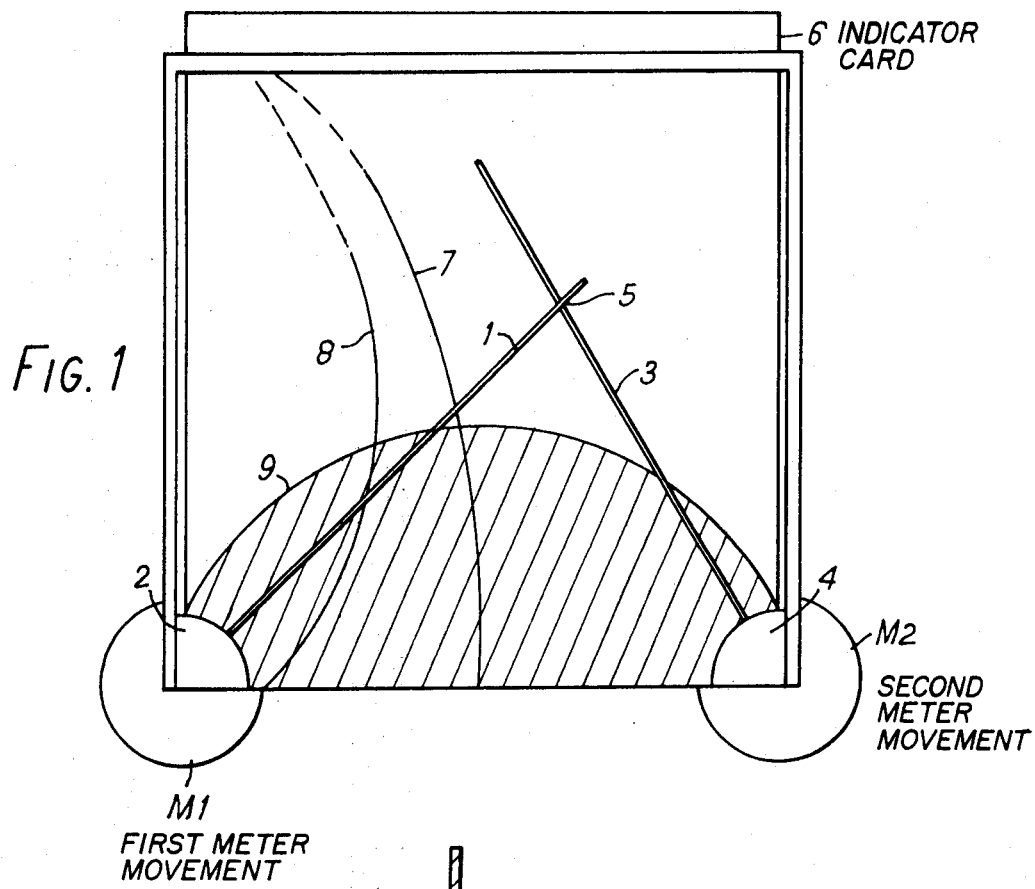
FIG. 1 is a front view showing the face of an indicator in accordance with the invention.
Figure 4:
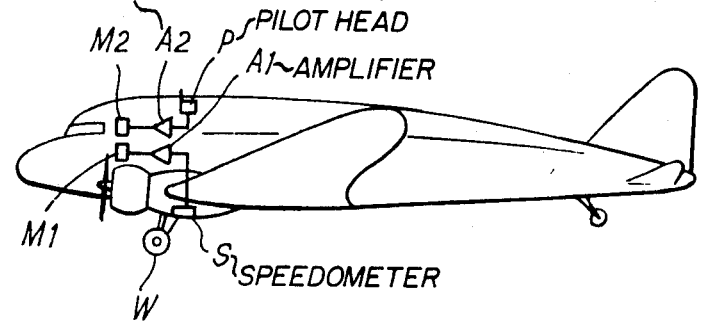
FIG. 4 is a schematic diagram of an aircraft fitted with an indicator of the kind described with reference to FIGS. 1 to 3.

Referring to FIG. 1, the indicator comprises a meter which is mounted on the instrument panel of an aircraft. The meter has a first movement M1 which moves a pointer 1 in an arcuate manner about a centre 2. The zero position of pointer 1 is horizontal. A second meter movement M2 moves another pointer 3 in an arcuate manner about a centre 4. Again, the zero position of pointer 3 is horizontal. The movement M1 which moves pointer 1 is energized by a current representative of the total distance moved by the aircraft along the runway from a start position. Thus, as the aircraft runs down the runway the pointer 1 moves progressively from the horizontal towards a vertical position. FIG. 4 shows schematically the movement M1 energized by first signal means comprising an integrating amplifier A1 which receives an input from a speedometer S coupled to the aircraft wheels W. The output from amplifier A1 is thus proportional to the distance travelled from a datum. This is a relatively simple arrangement, and clearly the distance indication can be derived alternatively from radar equipment, for example.

The movement M2 for pointer 3 is energized by a current derived from an air speed indicator. FIG. 4 shows schematically the movement M3 energized by an amplifier A2 which derives an air speed indication or a second signal from a pilot head P. Pointer 3 thus gives an indication representative of air speed and as speed increases the pointer moves from its horizontal zero position towards the vertical. The position of the crossover point 5 of the pointers at any particular time represents the relationship between the air speed and distance travelled. In order to relate this indication to the aircraft characteristics and other variables to give an indication of the safety margin in the take-off, there is provided an indicator card 6 which is slotted into the meter to be positioned behind the pointers. The indicator card is removable and may be replaced by other cards as will be described below.

The indicator card 6 is selected by the pilot from a set of ten cards which he has available. The cards carry markings which are appropriate to respective combinations of the characteristics of the aircraft, together with variables such as the nature of the runway, the weather conditions and the loading of the aircraft. The card is marked with a first curve 7 which indicates desired distance/speed curve during take-off. Ideally, the pilot should apply just enough power to ensure that during take-off the cross-over point 5 of the pointers follows curve 7 precisely.

The card 6 has a second curve 8 which represents the minimum permissible speed during take-off for a given distance. If the cross-over point 5 is allowed to follow curve 8 take-off will be achieved but with no safety margin and in practice this is not acceptable. Thus, the area between curves 7 and 8 is regarded as a danger area and if the cross-over point enters this area, power should be increased. If at any time the cross-over point 5 is to the left to curve 8 it means that safe take-off can not be achieved. A further indication is given by a line 9. The area below line 9 (shown shaded) indicates the region where take-off can be abandoned and the aircraft can be safely brought to a halt before the end of the runway. On the other hand, if the cross-over point 5 is above line 9, it means that the aircraft has travelled too fast and too far to be brought to a halt and take-off must be continued or the runway will be over-shot.

Figure 2:
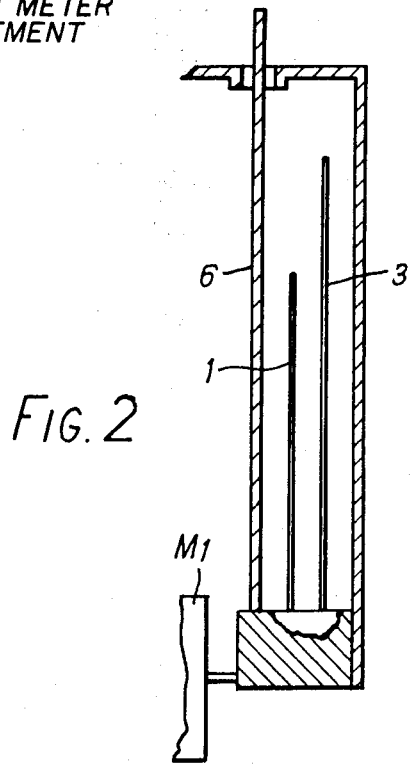
FIG. 2 is a side elevation of the indicator of FIG. 1.

Referring to FIG. 2, the side elevation of the instrument shows the position of the card 6 behind the pointers 1 and 3.

Figure 3:
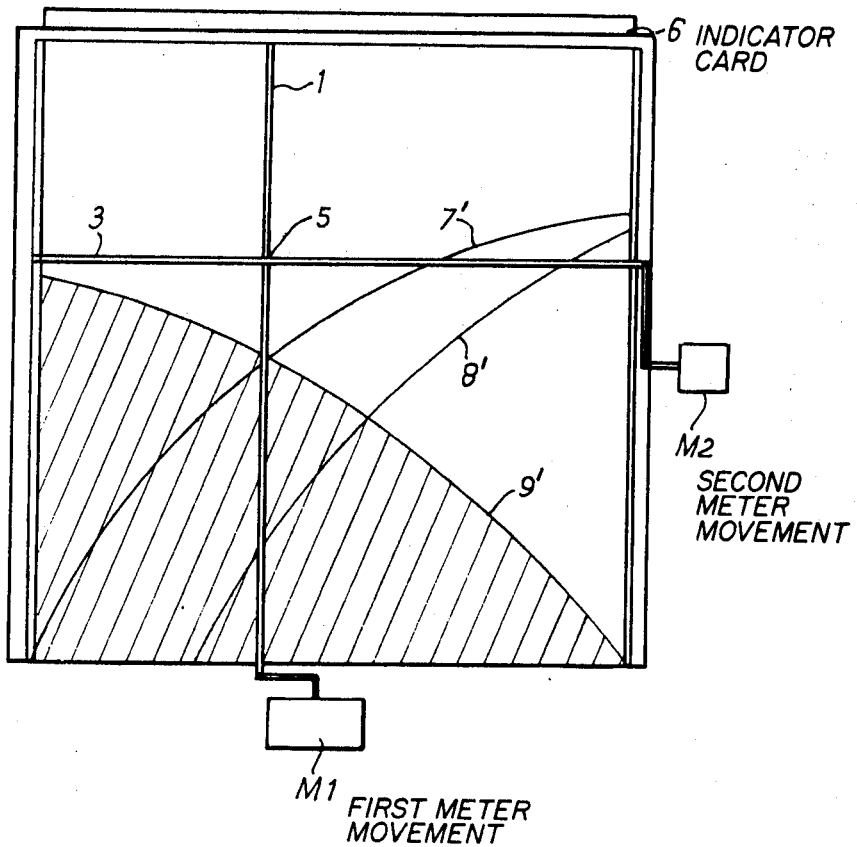
FIG. 3 is a front view showing the face of another indicator in accordance with the invention.

Referring now to FIG. 3, there is shown an alternative form of the meter display, the meter in this case having two movements which give parallel pointer drive. This means that the distance and speed pointers 1 and 3 respectively move rectilinearly, at right angles to their length. Pointer 1 has a zero position at the left-hand side of the display and pointer 3 has a zero position at the bottom of the display. Card 6 is again provided and curves 7' and 8' and line 9' correspond to those of the FIG. 1 display.

I claim:

1. A take-off safety indicator device for an aircraft, said device comprising:
   a meter housing;
   first signal means adapted to be mounted on an aircraft for generating a signal corresponding to the distance traveled by the aircraft during take-off;
   first movement and display means connected to said meter housing and to said first signal means and movable in response to said signal generated by said first signal means for visually displaying the distance traveled by the aircraft;
   second signal means adapted to be mounted on the aircraft for generating a signal corresponding to the air speed of the aircraft during take-off;
   second movement and display means connected to said meter housing and to said second signal means and movable in response to said signal generated by said second signal means for visually displaying the air speed of the aircraft during take-off;
   said first and second movement and display means during movement thereof overlapping one another at a single crossover point corresponding to the correlation between the distance traveled and air speed during take-off; and
   a display card removably inserted into said meter housing so that the movement of said first and second movement and display means is observable thereagainst, said card containing markings indicative of the locus of take-off correlations between air speed and distance traveled, as indicated by said crossover point, required for a safe take-off by the aircraft.

2. A take-off safety indicator device for an aircraft, said device comprising:
   a meter housing;
   first signal means adapted to be mounted on an aircraft for generating a signal corresponding to the distance traveled by the aircraft during take-off;
   first movement and display means connected to said meter housing and to said first signal means and movable in response to the signal generated by said first signal means for visually displaying the distance traveled by the aircraft during take-off, said first movement and display means including a first pointer movable corresponding to the signal generated by said first signal means;
   second signal means adapted to be mounted on the aircraft for generating a signal corresponding to the air speed of the aircraft during take-off;
   second movement and display means connected to said meter housing and to said second signal means and movable in response to the signal generated by said second signal means for visually displaying the air speed of the aircraft during take-off, said second movement and display means including a second pointer movable corresponding to the signal generated by said second signal means across the path of said first pointer;
   said first and second pointers during movement thereof overlapping at a crossover point corresponding to the relationship between air speed and distance traveled by the aircraft during take-off; and
   a removable display card inserted into said meter housing so that the movement of said first and second pointers is observable thereagainst, said card containing markings indicative of the locus of take-off correlations between air speed and distance traveled, as indicated by said crossover point, required for a safe take-off by the aircraft.

3. A take-off safety indicator device as claimed in claim 2, wherein said first and second pointers are pivotally mounted at different centers and move in an arcuate manner, so that the movements of the two pointers overlap.

4. A take-off safety indicator device as claimed in claim 2, wherein said first and second pointers extend perpendicular to their direction of movement and are perpendicular to each other.

5. A take-off safety indicator device as claimed in claim 2, wherein said removable display card is placed behind said pointers in a slot in said meter housing.

* * * * *